United States Patent [19]

Stephenson

[11] Patent Number: 4,511,539
[45] Date of Patent: Apr. 16, 1985

[54] RECOVERY OF PRECIOUS METAL

[75] Inventor: David J. Stephenson, Kempston, England

[73] Assignee: Johnson Matthey Public Limited Company, London, England

[21] Appl. No.: 590,546

[22] Filed: Mar. 19, 1984

Related U.S. Application Data

[63] Continuation of Ser. No. 367,063, Apr. 9, 1982, abandoned.

[30] Foreign Application Priority Data

Apr. 10, 1981 [GB] United Kingdom ............... 8111374

[51] Int. Cl.³ .................... B01J 19/04; C01B 21/28; C22B 11/02
[52] U.S. Cl. .................................. 422/311; 422/211; 423/392; 423/403; 75/83; 55/526; 55/527
[58] Field of Search ............ 423/392, 403; 75/83; 252/181.3, 181.6; 55/525, 526, 527; 422/211, 311; 156/DIG. 66

[56] References Cited

U.S. PATENT DOCUMENTS

| 2,730,189 | 1/1956 | Holzmann | 75/172 G X |
| 3,127,668 | 4/1964 | Troy | 428/605 |
| 3,434,826 | 3/1969 | Holzmann | 75/83 |
| 3,627,497 | 12/1971 | Klein et al. | 423/403 |
| 3,660,024 | 5/1972 | Gillespie | 423/403 |
| 3,776,701 | 12/1973 | Hunter | 423/392 X |
| 3,865,555 | 2/1975 | Elebracht et al. | 422/311 X |
| 4,351,887 | 9/1982 | Bishop et al. | 423/403 X |
| 4,412,859 | 11/1983 | Hatfield et al. | 423/403 X |

OTHER PUBLICATIONS

"Nitric Acid Rolls On", in *Chem. Eng.*, Jun. 29, 1970, pp. 24–25.

*Primary Examiner*—Ben R. Padgett
*Assistant Examiner*—Matthew A. Thexton
*Attorney, Agent, or Firm*—Cushman, Darby & Cushman

[57] ABSTRACT

The invention relates to the recovery of precious metal lost from precious metal-containing catalysts for example the precious metal-containing catalysts which are used in the production of nitric acid by ammonia oxidation. In more detail, a getter (as herein defined) for recovery of precious metal lost from a precious metal-containing catalyst operating at elevated temperature comprises an agglomeration or assemblage of unwoven fibres made from a metal selected from the group ruthenium, palladium, iridium, platinum, gold, silver, rhodium and alloys containing one or more of the said metals. Preferably, the unwoven fibres are randomly oriented.

21 Claims, 1 Drawing Figure

Variation of collection efficiency with gold content of Pd-Au alloys.

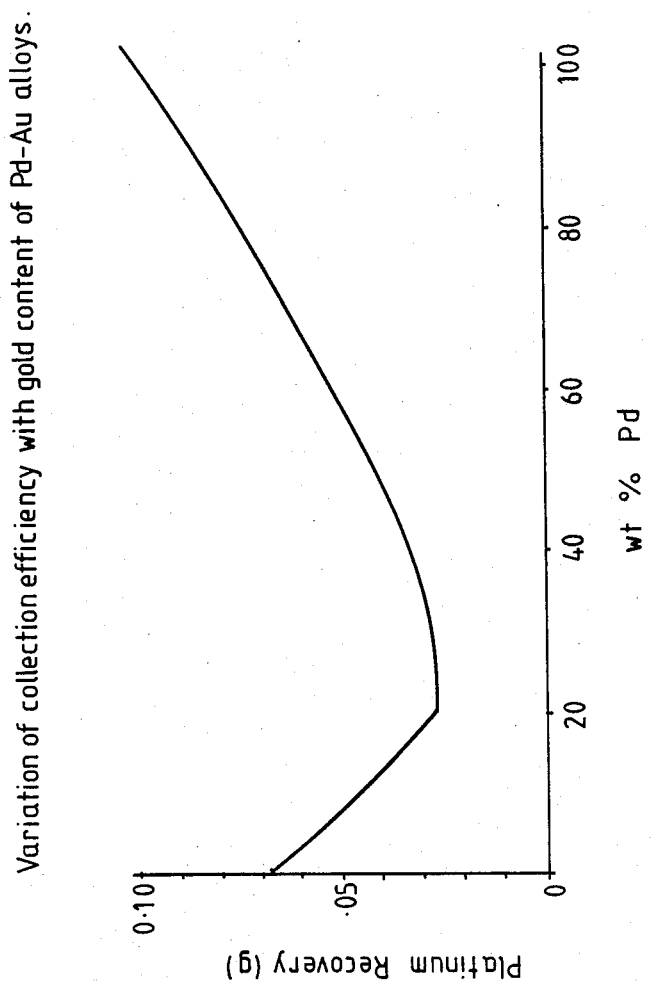

RECOVERY OF PRECIOUS METAL

This is a continuation of application Ser. No. 367,063, filed Apr. 9, 1982, now abandoned.

The invention relates to the recovery of precious metal lost from precious metal-containing catalysts for example the precious metal-containing catalysts which are used in the production of nitric acid by ammonia oxidation.

In commercial operation the manufacture of nitric acid by the oxidation of ammonia in contact with platinum alloy gauzes as catalyst is a fast and efficient process. The gauzes remain active for long periods of time although there is a steady loss of metal which in vaporised or oxidised form is swept away in the gas stream.

In comparison with overall running costs, this metal loss is not a major factor. Nevertheless recovery of as much of the lost metal as possible is undoubtedly worthwhile. Typical annual platinum losses which can be expected at normal throughputs and in the three main operating pressure ranges are as follows:

| Pressure range | Metal loss |
| --- | --- |
| 1–2 atms | 1–3 kg |
| 2–5 atms | 5–10 kg |
| 5 atms and above | 8–24 kg |

Early recovery methods relied on filtering metal particles from the gas stream. These methods have two main disadvantages;

(i) particles of platinum are retained only on the filter surface by mechanical lodgement and can be lost due to vibration of the plant or changes in the gas flow, and (ii) because the filter beds are necessarily dense, a high pressure differential develops across them.

The recovery efficiencies of these filters are low—a Raschig ring filter bed seldom recovers as much as 20% of the metal loss and glass-wool filters rarely recover more than 15%. Filtration processes also require special equipment built into the production plant.

These drawbacks were largely overcome by the development of gold-palladium catchment gauzes. These are described in British Pat. No. 1,082,105 and U.S. Pat. No. 3,434,826. In the earlier methods the gases were cooled before the recovery stage, whereas catchment gauzes collect the platinum at as high a temperature as possible while it is still in the vapour form, i.e., $PtO_2$ vapour. Thus the catchment gauzes are as close to the catalyst bed as possible. At these high temperatures platinum atoms striking a metal surface may be expected to diffuse into the metal, so that by contrast with the mechanical collection systems a positive "gettering" action is achieved. In this specification an article which acts in this way is referred to as a "getter".

Development work on gold-palladium systems is described by Holzmann. The most convenient form of extended metal surface was considered to be a gauze hence the ductility of the metal was an essential parameter. Other criteria that the metal had to meet were that it did not easily oxidise at 900°–1000° C., that it would form extensive solid solutions with platinum and that the rate of diffusion of platinum in the metal should be high. Oxide film formation would seriously inhibit the in-diffusion of platinum and this requirement effectively limits the use of base metals.

Trials were carried out on palladium and gold and a range of alloys by Holzmann. Collection efficiencies are shown in FIG. 1. It will be seen that pure palladium is the most effective collector but suffers considerable embrittlement in the oxidising environment of the ammonia burner. Hence best compromise between mechanical properties and gettering efficiency was obtained with a 20% Au-Pd alloy, and this is the composition currently used for getter gauzes.

In current practice 20% Au-Pd gauzes are separated from one another and from Pt-alloy catalyst pack by stainless steel mesh. The efficiency of each individual gauze varies depending upon the plant loading but is generally found to be independent of the amount of platinum to be collected, i.e., the first gauze collects about 20% of the gross platinum loss, then the second gauze collects 20% of the remainder etc. Economic recovery is generally about 55–70%. Above this range the cost of production and refining of the gauzes outweighs the value of the additional platinum recovered. This is because the extra number of gauzes required produce only a small percentage increase in recovery.

The disadvantages of present system are as follows:

(i) As can be seen from FIG. 1, the 20% Au-Pd alloy is not the most efficient. The higher the PD content the better.

(ii) The use of gauzes means that the mechanical properties of the material are a significant factor. This restricts the range of compositions which may be used.

(iii) Efficiency of the system is limited by surface area of the gauze material.

(iv) The stainless steel mesh used to separate gauzes sometimes produces difficulties due to embrittlement and the high thermal expansion coefficient can cause wrinkling or pulling out from the clamps.

According to a first aspect of the present invention a getter for recovery of precious metal lost from a precious metal-containing catalyst operating at elevated temperature comprises an agglomeration or assemblage of unwoven fibres made from a metal selected from the group ruthenium, palladium, iridium, platinum, gold, silver, rhodium and alloys containing one or more or the said metals. Preferably, the unwoven fibres are randomly oriented.

According to a second aspect of the present invention, a process for the recovery of precious metal lost from a precious metal-containing catalyst operating at elevated temperature comprises contacting reacting gases after their passage through the said catalyst with an agglomeration or assemblage of unwoven, preferably randomly oriented, fibres made from a metal selected from the group ruthenium, rhodium, palladium, iridium, platinum, gold, silver and alloys containing one or more of the said metals.

By "elevated temperature" is meant a temperature greater than 250° C.

The said agglomeration or assemblage is preferably placed downstream of the said precious metal catalyst (considered in relation to the direction of flow of the reacting gases) but nevertheless in close proximity thereto. The fibres are preferably relatively short filaments (in this context, by short we mean short when compared with the length of the wires used in the construction of conventional getter gauzes) which may be of generally circular or non-circular for example rectangular (i.e., of ribbon form) and "D" or semi-circular cross section. Where the fibres are of "D" cross-sectional shape, the major dimension falls within the range 0.004–0.006 inch and the minimum dimension falls within the range 0.002 to 0.005 inch. Preferably, the cross-sectional shape of the fibres is non-circular.

In the commercial production of nitric acid the mixture of air and ammonia may be passed through the catalyst at pressures in excess of 100 p.s.i. and at temperatures of between 650° C. and 1000° C. Where a getter according to the present invention is used in a reactor at such temperatures and pressures, it is preferably supported, at least downstream (when considered in the direction of flow of the reactants), by one or more conventional gauzes which may be made from a platinum group metal, an alloy containing at least one platinum group metal or made from an alloy stable at high temperatures such as a Kanthal (Registered Trade Mark). Kanthal is an aluminum-chromium-iron alloy which in weight percent, consists essentially of chromium (22.0%), aluminum (4.5%), cobalt (up to 2%), balance iron with minor amounts of sulphur, phosphorus, manganese, magnesium, etc. Conveniently, the agglomeration or assemblage of fibres is sandwiched between one or more layers of conventional gauze as mentioned above. According to a practical embodiment of the invention in the manufacture of nitric acid, the agglomerate or assemblage of fibres is disposed in close proximity to the catalyst zone. One or more gauzes support the agglomeration or assemblage from below and optionally one or more containing gauzes disposed above the agglomeration or assemblage, the said gauzes being made from a platinum group metal, an alloy stable at high temperature such as a Kanthal (RTM) or an alloy containing at least one platinum group metal. Preferably, the fibres of the agglomeration are made from palladium or a palladium-gold alloy. If desired, the fibres in the agglomeration may be welded, e.g. by laser techniques in order to produce a self supporting unit. Generally speaking, however, in use the fibres are bonded together by sintering.

It will, therefore, be appreciated that the getter according to the invention includes a first agglomeration of fibres sandwiched between first and second layers comprising at least one support gauze and a second agglomeration of fibres sandwiched between the said second layer and a third layer comprising at least one support gauze. Preferably a third agglomeration of fibres is sandwiched between the said third layer and a fourth layer comprising at least one support gauze. The first layer is conveniently a catalyst, for example a 90 Pt/5 Rh/5 Au. alloy, and the total weight of the fibres constitutes up to 50% of the weight of the catalyst. In a three tier agglomerate structure as mentioned above the first agglomerate constitutes up to 50 wt% of the total weight of the fibres and second and third agglomerates each constitute up to 25 wt% of total weight of the fibres.

Our experiments have shown that use of 90 Pt/5 Rh/5 Au (Na 90 Pt/10 Rh) catalyst and a three tier agglomerate structure with the fibre made from palladium in a conventional ammonia oxidation nitric acid plant, results in 20% less metal loss, a 50% increase in the length of the conventional plant running time and at 1-2 percent improvement in conversion efficiency.

The thickness of a pad of getter fibres is selected to be appropriate to the operating conditions of the nitric acid plant in which it is to be used. Various combinations of gauze layers with fibrous product agglomerates therebetween of various thicknesses can obviously be designed for various applications or plant parameters depending on prevailing plant conditions. Indeed by methods to be described below the supporting gauzes may be dispensed with entirely, especially if the fibres of the pad are bonded together e.g. laser welding, to give a strong self supporting assembly. In other works, the conventional pack of getter gauzes in an ammonia oxidation plant may be with advantage substituted either partially or completely with the random fibre arrangement of this invention. Such substitution can be as a single layer or various multiple sandwich arrangements as possible.

The agglomeration of fibers is compressed to a density such that the agglomeration contains between 10 and 30 kg per square meter of agglomerate, for example, within the range of 15 to 20 kg per square meter of agglomerate.

A number of methods for the production of appropriate fibres from an alloy containing at least one of the said metals may be used in the operation of the present invention as outlined below. Melt spinning in which fine metal jets or streams are rapidly solidifed on a rotating metal wheel, or the related process melt extraction may be used in the production of appropriate fibre, for example a palladium-gold alloy fibre. The fibre produced by these methods is preferred in this invention and may be either in substantially continuous lengths, which is subsequently cut to required lengths, or may be prepared in shorter discrete lengths of staple fibre. The length of fibre for use in the agglomerates which form part of the getter assemblies according to the present invention in conveniently within the range ½ to 4 inches and preferably within the range ½ to 2 inches. Such fibres can be produced by melt extraction process (sometimes referred to as "melt spun" or "melt extraction" process) by the apparatus described in U.S. Pat. No. 3,904,344. Alternatively, apparatus for producing fibres or filaments is described in U.S. Pat. Nos. 3,838,185 and 3,812,901.

In the melt spin process, a stream of molten metal or alloy is either allowed to solidify in free flight or is caused to solidify by contact with a so-called "chill-block". This is a cooled body or a body of high thermal capacity or both and is generally in the form of a rotating wheel, disc or dish or a moving belt. The stream of molten metal impinges on the body and is thrown off or removed therefrom as a continuous or discontinuous filament depending upon such parameters as the temperature and speed of the stream of molten metal or alloy as it impinges on the chill block and the surface speed of the chill block at the point of impingement. For example, if the temperature of the impinging stream and the surface speed of the chill block are held constant, any increase in the speed of impingement of the stream on the chill block will tend to cause the metal or alloy to pile up on the block so that the filament leaving it will increase in thickness. On the other hand, if the speed of impingement is progressively reduced, the tendency of the metal or alloy to pile up and the thickness of the resulting filament is also progressively reduced until the point is reached where the thinnest continuous filament possible at the particular temperature of the metal or alloy will be produced. Any further reduction in the speed of impingement will then result in the production of discontinuous filaments.

In the melt extraction or melt-drag process, molten metal or alloy first forms a meniscus between a nozzle at the end of a feed tube from a crucible containing a static head of the molten metal or alloy and the curved surface of a cooled rotating body such as a drum. The meniscus is partially solidified by contact the the body surface which drags away the solidifying metal or alloy to form a continuous filament. Solidification is completed as the body rotates and the solidified filament, which may be in the form of a fibre, a filament or a strip, is removed from the body surface before it has executed a complete revolution and is then coiled. Crimping of fibre by passing through toothed rollers is advantageous in yielding a material which knits or interwines more readily into a relatively rigid getter pad, and such crimping may be similarly advantageous to fibre produced by other processes.

Various methods may be employed for forming the fibre into suitable pads. For example, the alloy fibres may be allowed to settle from a viscous liquid medium, the liquid being extracted via a porous substrate in a manner similar to paper-making processes. Alternatively, the fibres may be distributed manually by hand over the required surface area, followed by lightly compressing into a pad of suitable thickness. If desired, the fibres may be bonded into a pad with a heat decomposable adhesive or binder which oxidises away in the early stages of a run using the new pad. By this stage the fibres have sintered together to form an agglomerate which does not disintergrate. Suitable adhesives which may be used for this purpose are ethylcellulose polymethylmethacrylate and polybutyl-methacrylate. To allow for easier handling the resulting pad may be converted into a more rigid assembly by stitching with platinum alloy wire. Stapling is a further possible method for achieving the same object. Spot welding at regular intervals or seam welding is also a successful method for partially binding the fibres together during the assembly stage.

The present invention has the following advantages:
(i) Fibres of any composition may be easily produced and Au-Pd alloys having higher palladium concentrations e.g. 5% Au-Pd are much more efficient in their gettering action.
(ii) Manufacture of a fibre pad is an easier and simpler operation than gauze manufacture because mechanical strength is not the highest priority. Production costs are lower.
(iii) The use of stainless steel Kanthal or other base metal gauzes could be limited to one gauze separating the getter pad from the catalyst pack.
(iv) The use of fibres allows the metal to be used more effectively. The fibres have a higher surface area to weight ratio and hence greater efficiency than gauzes.
(v) Material costs are lower because the gold content is reduced.
(vi) Increased collection efficiency will result in a longer life-time for the getter system.
(vii) A reduction in the gold content of the system increases the catalytic as well as gettering efficiency.

The fibre agglomerate or assemblage according to the invention has been found to give a performance at least equivalent to and generally better than that of conventional getter gauze packs in the manufacture of nitric acid. Further, use of the said agglomerates showed considerable metal saving compared with the use of standard getter gauzes. The use of fibres overcomes the tedious and expensive process of fine wire drawing and weaving.

I claim:
1. A getter for recovery of precious metal lost from a precious metal-containing catalyst operating at elevated temperature which comprises a self-supporting or supported agglomeration or assemblage of unwoven, randomly oriented fibres of a length falling within the range of ½ to 4 inches, an irregular surface and made from a precious metal selected from the group consisting of ruthenium, rhodium, palladium, iridium, platinum, gold, silver and alloys containing one or more of the said metals, said fibres being produced by a melt extraction or melt spun process.
2. A getter according to claim 1 wherein the fibres are of generally circular or non-circular cross section and bearing an irregular surface.
3. A getter according to claim 1 wherein the length of the fibres falls within the range of ½ to 2 inches.
4. A getter according to claim 3 wherein the fibres are of "D"-cross-sectional shape having the major dimension thereof falling within the range 0.004 to 0.006 inch and having the minor dimension thereof falling within the range 0.002 to 0.005 inch.
5. A getter according to claim 1 wherein the fibres are crimped.
6. A getter according to claim 1 wherein the agglomeration of fibres is compressed to a density such that the agglomeration contains between 10 and 30 kg per square meter of agglomerate.
7. A getter according to claim 6 wherein the said density falls within the range of 15 to 20 kg per square meter of agglomerate.
8. A getter according to claim 1 wherein the agglomeration of fibres is supported on at least one support gauze made from a platinum group metal or alloy thereof, stainless steel or Kanthal.
9. A getter according to claim 1 wherein the agglomeration of fibres is sandwiched between layers comprising one or more gauzes made from a platinum group metal, or alloy thereof or a stainless steel or Kanthal.
10. A getter according to claim 1 including a first agglomeration of fibres sandwiched between first and second layers comprising at least one support gauze and a second agglomeration of fibres sandwiched between the said second layer and a third layer comprising at least one support gauze.
11. A getter according to claim 10 including a third agglomeration of fibres sandwiched between the said third layer and a fourth layer comprising at least one support gauze.
12. A getter according to claim 10 wherein the said first layer comprises a catalyst.
13. A getter according to claim 1 wherein the total weight of the fibres constitutes up to 50% of the weight of the catalyst.
14. A getter according to claim 11 wherein the fibres of the first agglomeration constitute up to 50% of the total weight of the fibres and each of the second and third agglomerates constitute up to 25% of the total weight of the fibres.
15. A getter according to claim 13 wherein the total weight of the fibres constitutes from 1 to 10% of the weight of the catalyst.
16. A getter according to claim 1 wherein the fibres are made from a gold-palladium alloy.
17. A getter according to claim 1 wherein the fibres are made from palladium.

18. A getter according to claim 12 wherein the catalyst comprises 90 wt% platinum, 5 wt% rhodium and 5 wt% gold.

19. A getter according to claim 12 wherein the catalyst comprises 90 wt% platinum and 10 wt% rhodium.

20. A getter according to claim 15 which comprises a palladium-gold alloy contains 5% gold.

21. A getter according to claim 16 which comprises a palladium-gold alloy in which the palladium-gold alloy contains less than 15% gold.

* * * * *